(12) United States Patent
Boehme et al.

(10) Patent No.: US 6,578,191 B1
(45) Date of Patent: Jun. 10, 2003

(54) METHOD AND APPARATUS FOR DYNAMIC GENERATION OF ADAPTERS

(75) Inventors: Richard F. Boehme, Kent Lakes, NY (US); Matthew J. Duftler, Tarrytown, NY (US); David A. Epstein, Ossining, NY (US); Sanjiva Weerawarana, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/312,888

(22) Filed: May 17, 1999

(51) Int. Cl.[7] ................................................. G06F 9/44
(52) U.S. Cl. ...................... 717/107; 717/106; 717/108; 717/114; 717/116; 717/137; 717/152; 717/153
(58) Field of Search .................................. 717/107, 108, 717/106, 114, 116, 152–153, 137–141

(56) References Cited

U.S. PATENT DOCUMENTS 6,195,791 B1 * 2/2001 Carlson et al. ................. 717/1

OTHER PUBLICATIONS

Armstrong, "HotSpot: A new breed of Virtual Machine", Java World, http://www.javaworld.com/javaworld/jw–03–1998/jw–03–hotspot_p.html, pp. 1–12, Mar. 1998.*

Consel et al., "A General Approach for Run–Time Specialization and its Application to C", ACM, pp. 145–156, Jan. 1996.*

Altmeyer et al., "Generating ECAD Framework Code from Abstract Models", ACM, pp. 88–93, Jun. 1995.*

Dean et al., "Selective Specialization for Object–oriented Languages", pp. 93–102, ACM, Jun. 1995.*

IBM Technical Disclosure Bulletin, "Generating Event Adapters to Facilitate Connections Between Java Beans", vol. 41, No. 1, pp. 125–128, Jan. 1998.*

* cited by examiner

*Primary Examiner*—Gregory Morse
*Assistant Examiner*—Ted T. Vo
(74) *Attorney, Agent, or Firm*—Whitham, Curtis & Christofferson, P.C.; Stephen C. Kaufman

(57) ABSTRACT

This invention provides for the implementation of dynamic "event to method" adapter class generation. Event to method adapter classes and objects are automatically and dynamically generated and wired to source and target objects as required using a runtime environments language such as the Beans Markup Language (BML). Adapter classes and objects are automatically and dynamically generated as required while the application program loads and runs. Dynamically generated classes and objects need to exist only at the time that a running application calls for the adapters use, and can be dynamically modified or exchanged in order to optimize the running application or modify application functionality.

8 Claims, 2 Drawing Sheets

METHOD AND APPARATUS FOR DYNAMIC GENERATION OF ADAPTERS

BACKGROUND OF THE INVENTION

1. Field of the Invention

The present invention generally relates to Computer Aided Software Engineering (CASE) and, more particularly, a method for automatically generating adapter classes that convert output from a source object to input of a target object.

2. Background Description

Object oriented programming (OOP) is the preferred environment for building user-friendly, intelligent computer software. Key elements of OOP are data encapsulation, inheritance and polymorphism. These elements may be used to generate a graphical user interface (GUI), typically characterized by a windowing environment having icons, mouse cursors and menus. While these three key elements are common to OOP languages, most OOP languages implement the three key elements differently.

Examples of OOP languages are Smalltalk, Object Pascal and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. Object Pascal is the language used for Apple's Macintosh® computers. Apple developed Object Pascal with the collaboration of Niklaus Wirth, the designer of Pascal. C++ was developed by Bjarne Stroustrup at the AT&T Bell Laboratories in 1983 as an extension of C. The key concept of C++ is class, which is a user-defined type. Classes provide object oriented programming features. C++ modules are compatible with C modules and can be linked freely so that existing C libraries may be used with C++ programs. The most widely used object based and object oriented programming languages trace their heritage to Simula developed in the 1960s by O-J. Dahl, B. Myhrhaug and K. Nygard of Norway. Further information on the subject of OOP may be had by reference to *Object Oriented Design with Applications* by Grady Booch, The Benjamin/Cummings Publishing Co., Inc., Redwood City, Calif. (1991).

Rapid Application Design (RAD) tools, such as Microsoft's Visual Basic, offer a way to produce a software application in a relatively short period of time. Typically, RAD tools are used to generate the "look and feel" of an application, but the code generated by these tools are generally slow in execution. Therefore, many software houses prototype the Graphic User Interface (GUI) of their applications in a RAD tool and then implement the application in C++.

Despite the benefits of object-oriented program development, implementing large applications in, for example, C++ can be expensive. One approach to reducing the cost is to reuse object implementations. Object Oriented Programming (OOP) languages provide some degree of reuse. OOP is about describing how objects interact with one another. Component Object Programming (COP) is designed to produce reusable units of software. COP use building blocks for constructing custom software. Unlike OOP objects, COP hides details above the object-interaction level. There is no inheritance between components, although the objects that make up the component may inherit behavior from other objects, possibly in other components. In other words, when using a component, the inner workings of that component are oblivious to the application using the component. The component always appears as a single interface which formalizes properties, events and behavior. As a result of its well defined interface, a component may be easily reused. Components are to software what integrated circuits (ICs) are to electronics; they encapsulate function and provide services based on a strict specification of their interface. For example, a spell-check component encapsulates the minimum knowledge to completely perform its task. Thus, by combining components, large software applications can be built.

An advantage of COP is an additional level of modularity on top of what OOP already offers. The focus is on how entire sets of functionalities interact. OOP does not encapsulate groups of classes and objects. COP hides the information at the class level. Sun Microsystems' JavaBeans is a component architecture for the cross-platform Java programming language.

To illustrate this point, consider how the component model of programming used in Java and other object oriented programming environments assembles applications by binding or wiring together objects (components) which are generally obtained from a wide variety of component libraries.

Most often these components do not have the specific function necessary for direct wiring. This functionality is missing because components are obtained from different sources with different functionality and implementation, and because it would be wasteful to implement the incredibly wide variety of functionality available for each and every object in a library.

Therefore, components are wired by an adapter object which converts an output from the source object to an input of the target object. Present methodology requires production of adapter class source code either by the Integrated Development Environment (IDE) tool, by the wiring tool, or by hand coding.

This source code is then compiled and the adapter classes are included in the application. Most adapter classes follow a predictable pattern and can be dynamically generated and wired to their source and target objects at program execution (run) time rather than at development time. The delay in binding adapter classes to the application provides an opportunity for reducing the load time and size of applications, customizing the adapter classes for functionality, and tuning the adapter classes to optimize application performance.

The use of automatic dynamic adapter class generation will become even more important as the component model and component wiring tools are further developed and become a greater part of the worldwide application development effort.

SUMMARY OF THE INVENTION

It is therefore an object of the present invention to dynamically generate and load adapter classes, without human intervention, that convert output from a source object to an input to a target object.

The invention does not require generation of adapter source code by either the IDE or the programmer. Nor is a compiler required. Executable storage space is also reduced since storing adapter classes in the application executable is not required. Adapter classes and objects are automatically and dynamically generated as required while the application loads and runs. The classes and objects need only exist at the time that a running application calls for the adapter classes, and can be dynamically modified or exchanged in order to optimize the running application or modify application functionality. "Event to Method" adapter classes and objects are automatically and dynamically generated and wired to source and target objects as required using, for example, the Beans Markup Language (BML) runtime environments.

Since classes are generated directly, a compiler is not required. In the runtime environment of present development systems, there is no dynamic adapter generation. In the present invention, dynamic classes are directly generated, and therefore do not need to be included in the application executable. Also, the ability to provide for "late binding" of application components provides additional flexibility of adapter class functionality. The invention thus provides for smaller load and execution sizes by delaying adapter generation until demanded by the application. Also, since adapter byte code is generated directly, neither an integrated development environment or compiler is required. Finally, this invention provides possible runtime flexibility in generation, use and reuse of adapter classes, and possible runtime optimization of application memory size and execution speed through adapter class functionality and usage.

Development environments from text editors to IDE's including Visual builders generate source code either automatically or by hand coding. They do not generate executable code.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The detailed description is provided in terms of an implementation in the Java programming language. However, the invention can also be practiced using other object oriented programming languages.

Figure 1:
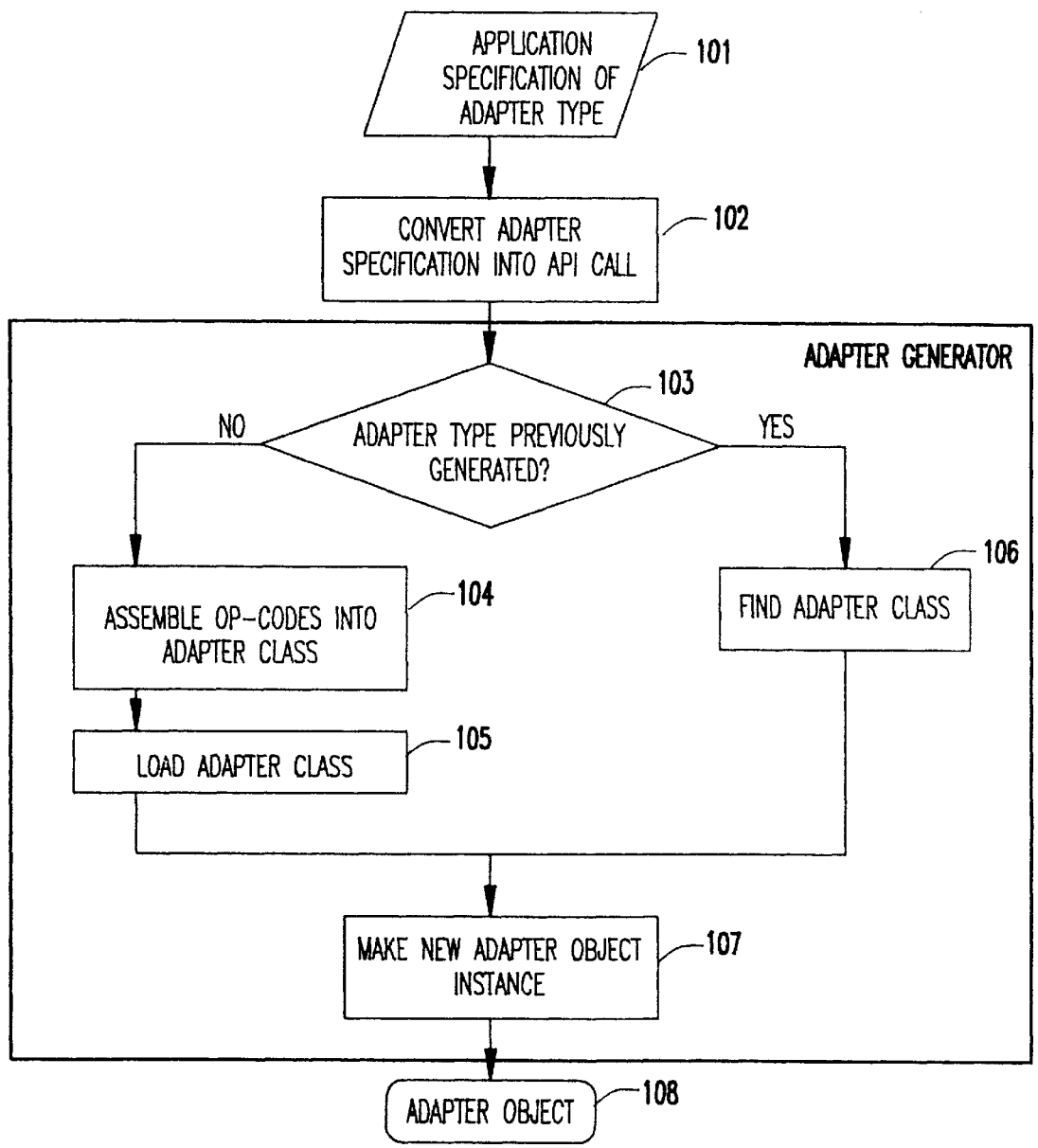
FIG. 1 is a flow diagram of the process of creating an adapter object.

Referring now to the drawings, and, more specifically to FIG. 1, the invention utilizes an application specification of the adapter type, as shown in input block 101. A description of the wiring between the source object and the target object is utilized.

For example, in a BML "Event to Method" implementation of the invention, a BML specification of an adapter type that wires an AWT Button to a "Juggler" component (Bean) so that the Juggler will start juggling when the button is pushed is provided in input block 101. The sample source code illustrating this is as follows:

```
<bean class="java.awt.Button">
  <property name="label" value="Start"/>
  <event-binding name="action"
    target="Juggler" targetMethod="start"
    filter="actionPerformed"/>
</bean >
```

In function block 102, the adapter specification is converted into an application programming interface (API) call. The syntax of the description is defined in an implementation of an API to this invention.

For example, the BML runtime determines that an "Event to Method" adapter needs to be generated, obtains the ListenerType (LT) for the "Action Event" from the "Juggler" Bean and requests a "BMLAction" adapter, as illustrated by the following source code:

```
beanInfo=Introspector.getBeanInfo(jugglerClass);
EventSetDescriptor esds[ ]=beanInfo.getEventSetDescriptors( );
for (int i=0; i<esds.length;++i)
{
  if(actionEventName.equals(esds[i].getName( )))
  {return makeEventAdapterClass(esds[i]
    .getListenerType( ));}
}
```

In decision block 103, a test is made to determine whether the adapter type has been previously generated. Code within the adapter generator is utilized to perform the test. In function block 104, if the adapter class has not been previously generated, the bytecodes necessary to construct the adapter class, interface, fields, methods and attributes are generated based upon the wiring description, and the op-codes (i.e. the generated code fragments) are assembled into an adapter class. Sample source code illustrating these steps is as follows:

```
ClassInfo newClass=new ClassInfo( );
newClass.setName("BMLActionEventAdapter");
newClass.setSourceFilename("BMLAction
  EventAdapter");
newClass.setSuperClassName("com/ibm/bml/
  EventAdapterImpl");
newClass.addInterface("ActionEventListener");
newClass.setAccessFlags((short)(ACC_PUBLIC|ACC_
  SUPER));
newClass.addSpecialMethod(ACC_PUBLIC, "<init>",
  "( )V", bytecodes);
newClass.addMethod(ACC_PUBLIC,
  "actionPerformed",
  "(LActionEvent;)V", bytecodes);
ByteArrayOutputStream baos=new
  ByteArrayOutputStream( );
newClass.write(new DataOutputStream(baos));
```

The adapter class in then loaded into the running application in function block 105, as illustrated by the following source code:

```
Loader ldr=new BMLLoader( );
Class adapterClass=
ldr.defineClass("BMLActionEventAdapter",
  baos.toByteArray( ));
```

An instance of the adapter class is instantiated in function block 107, as illustrated by the following source code:

```
Object adapterObject=adapterClass.Newinstance( );
```

In output block 108, the adapter object is returned to the application. The application then wires the adapter to the source and target objects associated with the application. Additional wiring of the adapter class, if required, is performed consistent with the adapter class design.

If the test performed in decision block 103 indicates that the adapter class has been previously generated, the location of the adapter class is determined in function block 106, as illustrated by the following source code:

```
Class       adapterClass=getLoadedClass
    ("BMLActionEventAdapter
    ");
```
Then, as before, an instance of the adapter class is instantiated in function block 107. In output block 108, the adapter object is wired to the source and target objects, and returned to the application. The application then wires the adapter to the source and target objects associated with the application. Additional wiring of the adapter class, if required, is performed consistent with the adapter class design.

Additional instants of the adapter class are instantiated to wire additional source and target objects. In addition, multiple source object/target object pairs can be wired to a single instance of the adapter class which multiplexes the function of the adapter. Additional instants of the adapter class are instantiated to wire additional source and target objects. In addition, multiple source object/target object pairs can be wired to a single instance of the adapter class which multiplexes the adapter's function.

Figure 2:
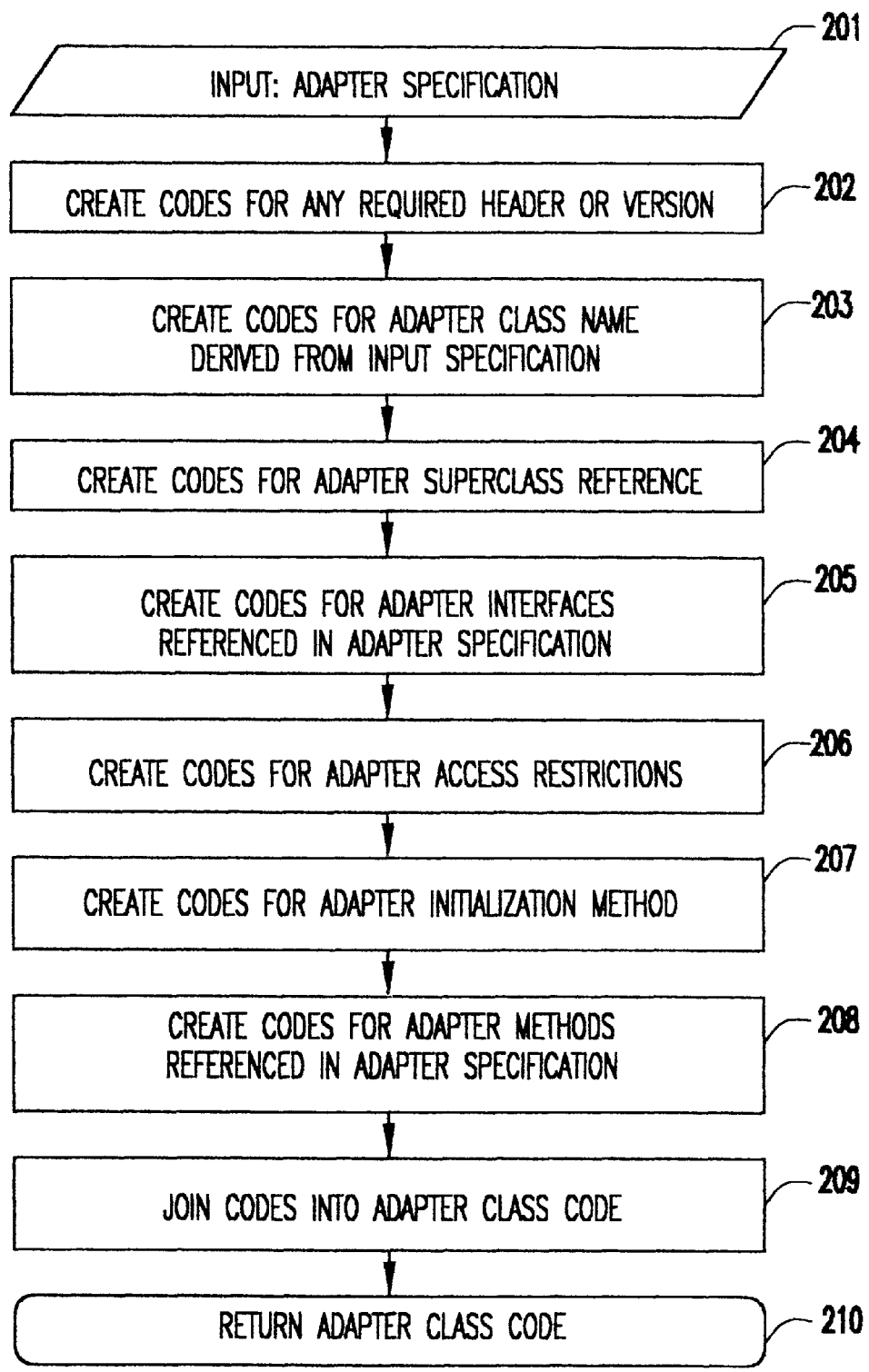
FIG. 2 is a flow diagram of the process of assembling op-codes into an adaptor class.

FIG. 2 shows the process of assembling op-codes into an adaptor class. As shown in input block 201, the adapter specification is provided as input. The adapter specification will contain information necessary to name the adapter class, reference the adapter class superclasses, interfaces and methods. The specification may also contain information necessary to modify any default class access restrictions, and initialization methods. There may also be information necessary to modify the function and behavior of generated adapter classes. For example, this information may allow or disallow multiplexing of the generated adapter object by multiple source or target components. In function block 202, code is created for any language specific header, identification or version information. In function block 203, codes are created for the adapter class name, which identifies this class to the application requesting this adapter. The codes can also be used to name a class file which could be output for permanent storage on hard disk or other media. These codes can be derived for the input specification of input block 201. In function block 204, code is generated for the adapter class superclass references taken from the input specification provided in input block 201. Then, in function block 205, code is created for adapter class interface references taken from the input specification provided in input block 201. In function block 206, code is created for adapter class access restrictions, which define how this class may be accessed by the application. These restrictions may be able to be modified according to the input specification provided in input block 201. In function block 207, code is created for the adapter class initialization methods, which may be able to be modified according to the input specification provided in function block 201. In function block 208, code is created for the adapter class methods referenced in the adapter class specification provided in function block 201. There may be additional specifications in function block 201 that customize the function found in these methods, allowing for behavior different from the default behavior. For example, the function may be customized to permit performance tuning, and allow for dynamic binding and unbinding for source and target classes. The function may also be customized to permit other desirable behavior. In function block 209, the codes are joined into a fully functional adapter class with structure meeting the requirements of the intended application. Finally, in function block 210, the adapter class code is returned to the application.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method for dynamically generating adapter classes that convert an output from a source object to an input of a target object, comprising the steps of:

generating by an adapter generator in a run-time environment a plurality of instruction codes for constructing an adapter class based upon an adapter specification associated with a specific adapter type; and assembling the plurality of instruction codes into the adapter class, wherein said adapter specification is provided to said adapter generator by an application running in said run-time environment and said steps of generating a plurality of instruction codes and assembling the plurality of instruction codes are performed by said adapter generator at run-time without human intervention by generating an executable for use by said running application.

2. The method according to claim 1, further comprising the step of loading the adapter class into a running application program.

3. The method according to claim 2, further comprising the step of instantiating an instance of the adapter class, wherein the instantiation results in an adapter object.

4. The method according to claim 1, further comprising the step of converting the adapter specification into an application programming interface call.

5. The method according to claim 3, further comprising the step of returning the instantiated adapter object to a running application program.

6. The method according to claim 1, further comprising the step of finding the adapter class if it has already been generated.

7. The method according to claim 1, wherein the generating step is comprised of the following steps:

a) providing an input for an adapter specification;

b) creating codes for a header and a version;

c) creating codes for an adapter class name derived from an input specification;

d) creating codes for an adapter superclass reference;

e) creating codes for adapter interfaces referenced in the adapter specification;

f) creating codes for adapter access restrictions;

g) creating codes for adapter initialization method;

h) creating codes for adapter methods referenced in the adapter specification;

i) joining codes created in steps b) thru h) into an adapter class code; and j) returning the adapter class code to an application program.

8. The method according to claim 1, wherein said step of generating instruction codes includes generating bytecodes for constructing the adapter class, interface, fields, methods, and attributes and generating op-codes for assembly into the adapter class.

* * * * *